US007529110B1

(12) United States Patent
Haines

(10) Patent No.: US 7,529,110 B1
(45) Date of Patent: May 5, 2009

(54) UNIVERSAL POWER ADAPTER

(75) Inventor: Lance P. Haines, Wilmington, MA (US)

(73) Assignee: American Power Conversion Corporation, West Kingston, RI (US)

( * ) Notice: Subject to any disclaimer, the term of this patent is extended or adjusted under 35 U.S.C. 154(b) by 296 days.

(21) Appl. No.: 11/439,335

(22) Filed: May 22, 2006

Related U.S. Application Data

(60) Provisional application No. 60/683,206, filed on May 20, 2005.

(51) Int. Cl.
*H02M 7/00* (2006.01)
(52) U.S. Cl. ...................................................... 363/65
(58) Field of Classification Search .................. 363/50, 363/52, 53, 65, 142, 146; 307/51, 52, 56, 307/58, 62, 71–75, 82, 85, 86; 361/18, 86, 361/87, 91.1, 93.8, 93.1
See application file for complete search history.

(56) References Cited

U.S. PATENT DOCUMENTS

| | | | | |
|---|---|---|---|---|
| 6,893,153 | B2 * | 5/2005 | Hoffer et al. ................. | 374/152 |
| 6,980,443 | B2 * | 12/2005 | Nagano et al. ............ | 363/21.12 |
| 7,072,200 | B2 * | 7/2006 | Lanni ......................... | 363/146 |
| 7,245,469 | B2 * | 7/2007 | Nemoto et al. ............... | 361/65 |
| 7,394,674 | B2 * | 7/2008 | Huang ......................... | 363/65 |

\* cited by examiner

*Primary Examiner*—Matthew V Nguyen
(74) *Attorney, Agent, or Firm*—Townsend and Townsend and Crew LLP

(57) ABSTRACT

A power conversion device for receiving AC and/or DC power and providing a DC output includes: an AC input; a DC input; an output; AC-to-DC converter circuitry coupled to the AC input and to the output and configured to convert an AC voltage received at the AC input into a first output DC voltage and to provide the first output DC voltage to the output; and non-isolated DC-to-DC up/down converter circuitry coupled to the DC input and to the output and configured to directly convert an input DC voltage received at the DC input into a second output DC voltage that is one of a down-converted DC voltage that is lower than the input DC voltage and an up-converted DC voltage that is higher than the input DC voltage, the DC-to-DC up/down converter circuitry being further configured to provide the second output DC voltage to the output.

9 Claims, 3 Drawing Sheets

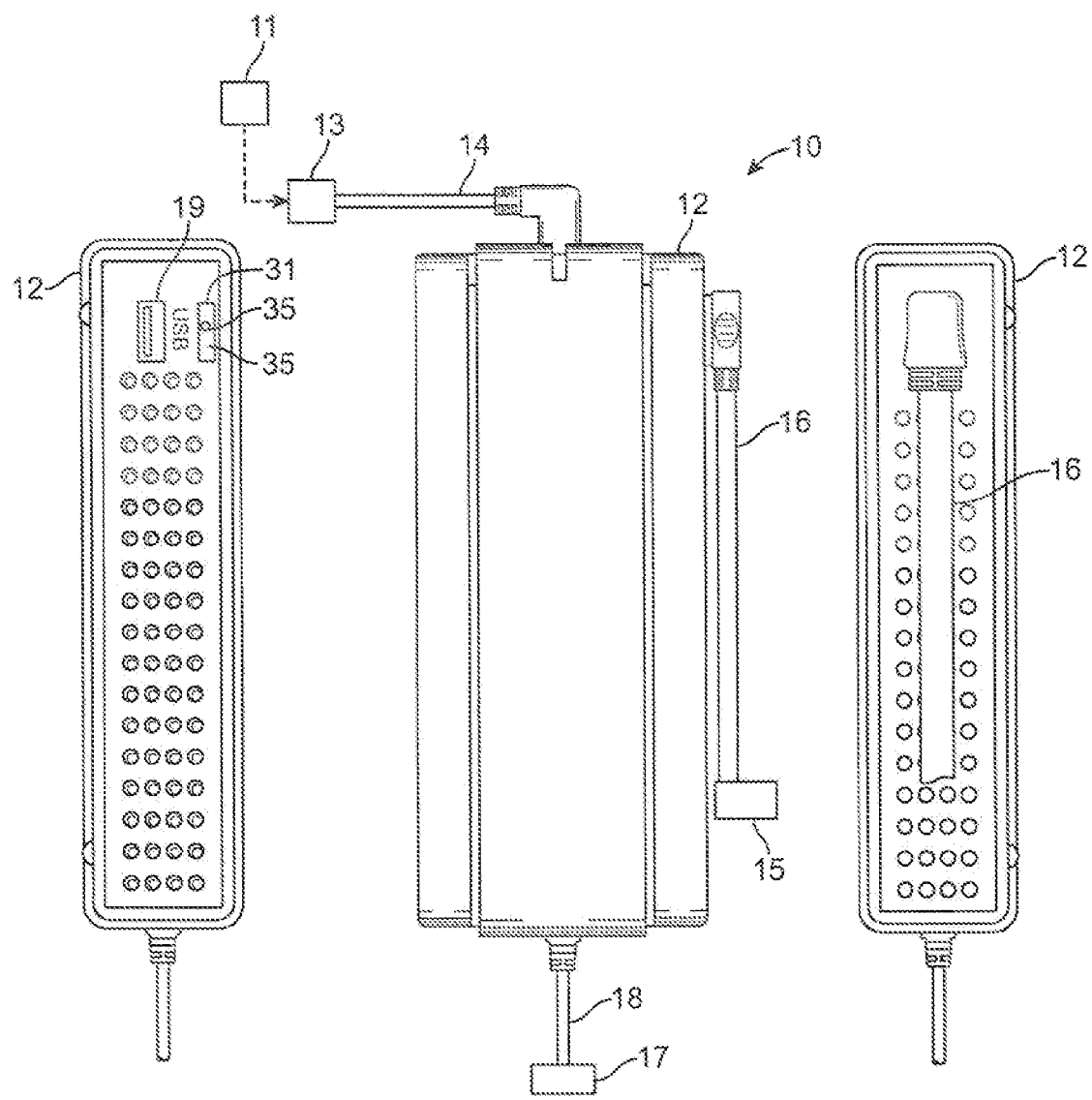

UNIVERSAL POWER ADAPTER

CROSS-REFERENCE TO RELATED ACTIONS

This application claims the benefit of U.S. Provisional Application No. 60/683,206 filed May 20, 2005, which is incorporated herein by reference.

BACKGROUND OF THE INVENTION

The proliferation of portable and laptop computers has greatly expanded the need for consistent, reliable power sources. A laptop computer is limited by the power available from the internal batteries. When the batteries become discharged, a source of power is needed to recharge them. Typically, a laptop computer includes a power adapter for connecting the laptop computer to a power utility outlet for recharging the batteries and powering the computer. However, there are no standards for power adapters or laptop computers. Different brands of laptop computers require different power levels and/or different voltages. Thus, power adapters are not interchangeable and can only be used with a specific brand or model computer. If a power adapter is lost or malfunctions, it cannot be easily replaced.

Furthermore, travelers who regularly use laptop computers sometimes have access to wall outlet power, but often do not have access to a power utility outlet, such as when they are on an airplane or in a car. Such locations, however, typically have power outlets by may have different types and/or voltages of power sources. Airlines have begun installing power connectors for providing DC power for passenger equipment. Automobiles have "cigarette lighters" or similarly designed power jacks which provide 12 volt DC power from the automobile battery. Some trucks use two series-connected 12 volt DC batteries to power the truck and thus have cigarette lighter outlets that provide 24 volts DC. Regular laptop power adapters cannot utilize these power sources. Additionally, international travelers encounter utility power connectors which differ from those in the United States. For example, utility power in Europe is typically 230 volts compared to 120 volts in the United States. The power connections are also different. While computer manufacturers produce power adapters for a variety of power sources including automobiles, airplanes and international sources, these power adapters often have to be purchased separately. A traveler often has to carry a variety of power adapters to be utilized in different situations.

SUMMARY OF THE INVENTION

In general, in an aspect, the invention provides a power conversion device for receiving AC and/or DC power and providing a DC output, the device including: an AC input; a DC input; an output; AC-to-DC converter circuitry coupled to the AC input and to the output and configured to convert an AC voltage received at the AC input into a first output DC voltage and to provide the first output DC voltage to the output; and non-isolated DC-to-DC up/down converter circuitry coupled to the DC input and to the output and configured to directly convert an input DC voltage received at the DC input into a second output DC voltage that is one of a down-converted DC voltage that is lower than the input DC voltage and an up-converted DC voltage that is higher than the input DC voltage, the DC-to-DC up/down converter circuitry being further configured to provide the second output DC voltage to the output.

Implementations of the invention may include one or more of the following features. The device further includes a first controller coupled to the output, to the AC-to-DC converter circuitry, and to the DC-to-DC up/down converter circuitry and configured to control at least one of the AC-to-DC converter circuitry and the DC-to-DC up/down converter circuitry in response to a voltage level detected at the output to regulate the voltage level at the output to a desired level. The device further includes a selector coupled to the processor and configured to be actuated to one of a discrete set of positions indicating respective discrete desired voltages. The DC-to-DC up/down converter circuitry includes switches coupled to the first controller and the first controller is configured to control opening and closing of the switches to regulate a duty cycle of the switches to provide the down-converted DC voltage and the up-converted DC voltage as appropriate in accordance with a position of the selector. The selector is connected to a resistor network that is connected to a reference voltage source to provide a different voltage value corresponding to each of the positions of the selector.

Also, implementations of the invention may include one or more of the following features. The device further includes an auxiliary output, and non-isolated DC-to-DC down converter circuitry coupled to the auxiliary output, to the DC-to-DC up/down converter circuitry, and to the AC-to-DC converter circuitry and configured to convert a DC voltage provided by the DC-to-DC up/down converter circuitry and/or by the AC-to-DC converter circuitry to a lower voltage level and to provide the lower voltage level to the auxiliary output. The device further includes a second controller coupled to the auxiliary output and to the DC-to-DC down converter and configured to cause the DC-to-DC down converter to output a fixed DC voltage of one of about 3.3 Vdc and about 5 Vdc. The auxiliary output comprises a USB port with only power pins of the USB port connected to the DC-to-DC down converter circuitry.

Also, implementations of the invention may include one or more of the following features. The device further includes a controller, where the DC-to-DC up/down converter circuitry includes switches coupled to the controller, the controller being configured to control opening and closing of the switches to provide the down-converted DC voltage and the up-converted DC voltage as appropriate. The device further includes a controller coupled to the output, the AC-to-DC converter, and to the DC-to-DC up/down converter and configured to monitor voltage and current at the output and to guard against overvoltage and overcurrent conditions at the output. The device further includes a controller coupled to a temperature sensor, to the AC-to-DC converter, and to the DC-to-DC up/down converter and configured to monitor a temperature indicated by the temperature sensor and to guard against an overtemperature condition of the device.

In general, in another aspect, the invention provides a power conversion device for receiving AC and/or DC power and providing a DC output, the device including: an AC input; a DC input; an output; AC-to-DC converter circuitry coupled to the AC input and to the output and configured to convert an AC voltage received at the AC input into a first output DC voltage and to provide the first output DC voltage to the output; non-isolated DC-to-DC up/down converter circuitry coupled to the DC input and to the output and configured to directly convert an input DC voltage received at the DC input into a second output DC voltage that is one of a down-converted DC voltage that is lower than the input DC voltage and an up-converted DC voltage that is higher than the input DC voltage, the DC-to-DC converter circuitry being further configured to provide the second output DC voltage to the output; a first controller coupled to the output, the DC-to-DC up/down converter, and to the AC-to-DC converter and configured to regulate voltages provided by the DC-to-DC up/down converter and the AC-to-DC converter to provide a desired output voltage to the output; an auxiliary output; non-isolated DC-to-DC down converter circuitry coupled to the auxiliary output, to the DC-to-DC up/down converter circuitry, and to the AC-to-DC converter circuitry and configured to convert a DC voltage provided by the DC-to-DC up/down converter circuitry and/or by the AC-to-DC converter circuitry to a lower voltage level and to provide the lower voltage level to the auxiliary output; and a second controller coupled to the DC-to-DC down converter, to the DC-to-DC up/down converter, and to the AC-to-DC converter and configured to regulate a voltage provided by the DC-to-DC down converter and the AC-to-DC converter to provide a desired output voltage to the auxiliary output.

Implementations of the invention may include one or more of the following features. The device further includes a selector coupled to the first processor and configured to be actuated to one of a discrete set of positions indicating respective discrete desired voltages. The DC-to-DC up/down converter circuitry includes switches coupled to the controller and the controller is configured to control opening and closing of the switches to regulate a duty cycle of the switches to provide the down-converted DC voltage and the up-converted DC voltage as appropriate in accordance with a position of the selector. The device further includes a resistor network and reference voltage source coupled to the output and the selector is connected to the resistor network and configured to connect to different portions of the resistor network that provide different voltage values corresponding to the different positions of the selector. The first controller is configured to monitor voltage and current at the output and to guard against overvoltage and overcurrent conditions at the output. The first controller is coupled to a temperature sensor and is configured to monitor a temperature indicated by the temperature sensor and to guard against an overtemperature condition of the device.

Various aspects of the invention may provide one or more of the following capabilities. Various AC and DC voltage levels can be converted to a regulated, selectable DC output voltage by a single device. DC-to-DC voltage conversion can be provided in a small form factor, by a device that generates less heat than other DC-to-DC converters, and/or at a lower cost than other DC-to-DC converters.

These and other capabilities of the invention, along with the invention itself, will be more fully understood after a review of the following figures, detailed description, and claims.

BRIEF DESCRIPTION OF THE FIGURES

FIGS. 1-3 are left side, front, and right side views, respectively, of a universal power adapter housing and connector cables.

DETAILED DESCRIPTION OF PREFERRED EMBODIMENTS

Figure 4:
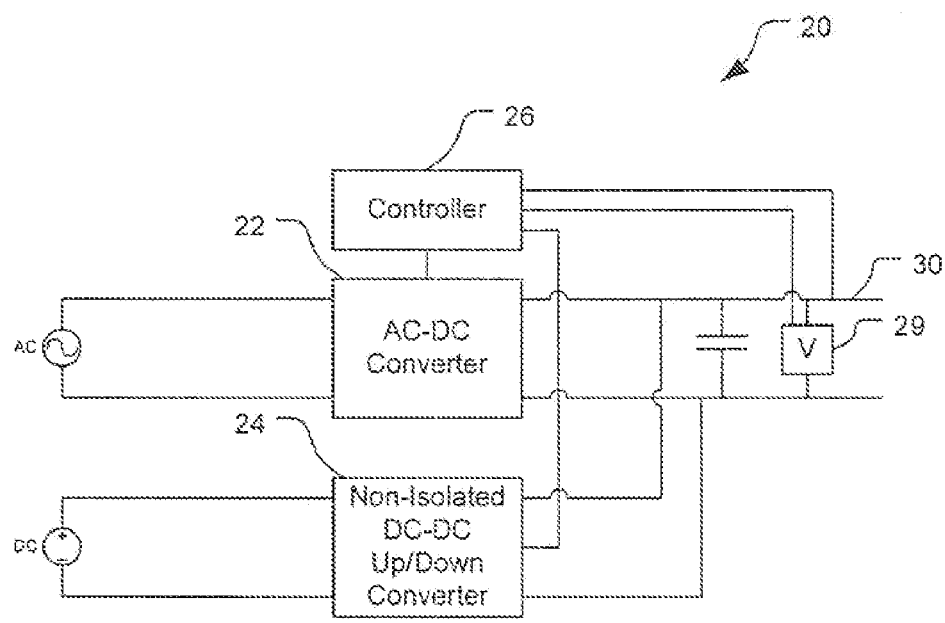
FIG. 4 is a simplified block and circuit diagram of a universal power adapter.

Embodiments of the invention provide techniques for providing a regulated DC output voltage from AC and/or DC input power. For example, a universal power adapter (UPA) may include an AC input and a DC input, with an AC-to-DC converter connected to the AC input and a non-isolated, up/down DC-to-DC converter connected to the DC input. Outputs of the AC-to-DC and DC-to-DC converters are connected to a UPA output. The converters are configured to provide a regulated, selectable DC output voltage at the UPA output. An auxiliary DC output voltage may also be provided, e.g., at a reduced voltage level such as 5VDC or 3.3VDC. Other embodiments are within the scope of the invention.

Referring to FIGS. 1-3 a UPA 10 includes a housing 12, a DC input cable 14, an AC input cable 16, a power output cable 18, and an auxiliary output port 19. The input cables 14 and 16 are preferably detachable and configured to removably mate with inputs of the UPA 10, through ports in the housing 12. The AC input cable 16 is configured with a plug 15 for insertion into a wall outlet. The DC input cable 14 is configured with an EmPower® plug 13 for insertion into an aircraft outlet. A removable adapter 11 is configured to fit onto the aircraft outlet plug, and to fit into a cigarette lighter socket. The power output cable 18 preferably includes a connector 17 for connecting to a laptop computer, although other connectors (e.g., for connecting to a mobile phone, a personal digital assistant (PDA), or other device) may be used. The auxiliary output port 19 provides a second DC output, e.g., of 5V or 3.3V, and is here configured as a USB port with only the power pins connected.

Referring also to FIG. 4, the UPA 10 includes power conversion circuitry 20 that includes an AC source 21, an AC-to-DC converter 22, a DC source 23, a DC-to-DC converter 24, and a controller 26. The AC source 21 provides between about 100 Vac and about 240 Vac and the DC source 23 provides about 50 Vdc or less. The DC-to-DC converter 24 is a non-isolated up/down converter configured to receive an input DC voltage and output a DC voltage of a desired level, either raising the voltage level if the desired level is higher than the input level or reducing the level if the desired level is lower than the input level. The DC-to-DC converter 24 preferably can receive input voltages from between about 11VDC and about 16VDC. The output voltage is raised or lowered directly, as opposed to being made to a predetermined level, and then adjusted after that to the desired level. The AC-to-DC converter 22 is configured to receive AC power from the AC source 21, e.g. from about 100Vac to about 240Vac, and output a DC voltage, e.g., about 50Vdc or less. Any of a variety of well-known arrangements (e.g., a flyback converter) may be used for the AC-to-DC converter 22 (e.g., including a diode rectifying stage, a power factor correcting stage, a transistor (e.g., FET) stage, a transformer, and a further diode stage). The DC-to-DC converter 24 is configured to receive DC power from the DC source 23, e.g. about 50Vdc or less, and output DC power, e.g., 65 W DC power with an appropriate DC voltage, e.g., about 50Vdc or less, such as 12Vdc-20Vdc, 12Vdc-24Vdc, or other voltage as appropriate, e.g., for laptop computers.

Figure 5:
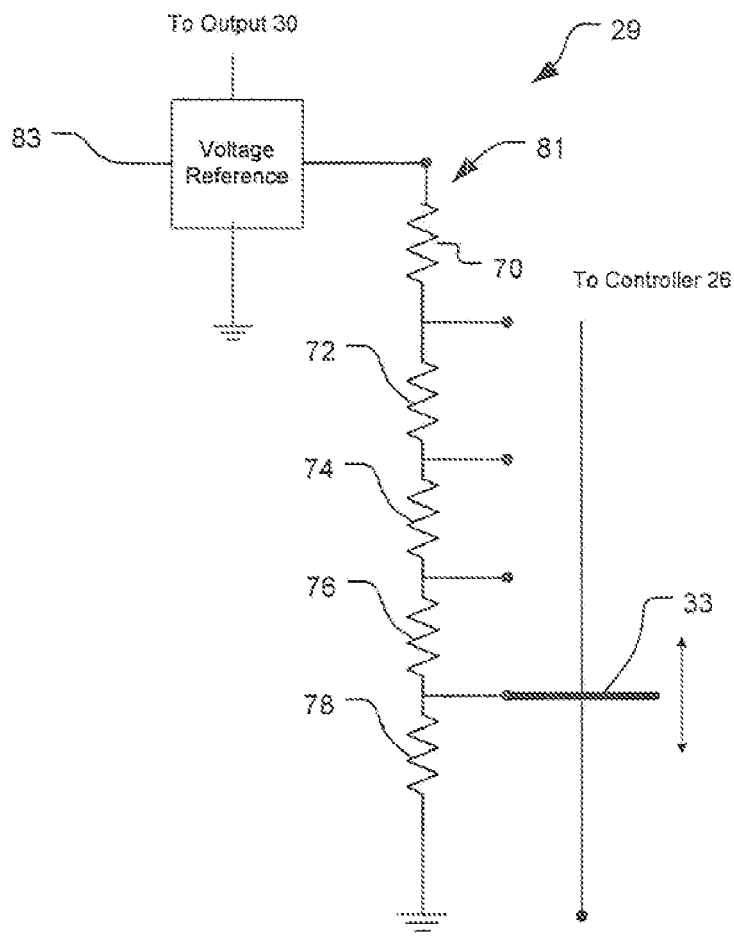
FIG. 5 is a circuit diagram of a resistor network and voltage reference of the universal power adapter shown in FIG. 4.

The voltage provided to a UPA output 30 of the UPA circuit 20 can be set to a desired level. For example, a switch 31 (FIG. 1) can be provided on the exterior of the housing 12 that can be moved by a user to indicate a desired voltage. The switch 31 is shown in FIG. 1 disposed on a side face of the housing 12, although it may be disposed elsewhere, such as on a back face of the housing 12. The switch 31 includes a slidable member 33 that provides a recess 35 configured to receive an implement such as a pen tip such that the member 33 can be moved by inserting a pen tip or other implement into the recess 35 and moving the member 33 up or down. The member 33 is preferably configured to slide between several positions (each corresponding to a desired voltage level) and to resist movement once in one of the several positions. Internally, placement of the switch 31 into one of the several positions affects the voltage at the output 30. Referring also to FIG. 5, the switch 31 selects a voltage provided by a resistor divider network 81 of an output voltage selector circuit 29. The circuit 29 is disposed in parallel with an output capacitor of the power conversion circuitry 20 and includes the resistor divider network 81, a voltage reference 83 and switch 35 connected to the slidable member 33. The voltage reference 83 provides a fixed voltage derived from the output voltage at the output 30. The resistor network 81 divides the reference voltage into several available fixed voltages at respective nodes between resistors 70, 72, 75, 76, 78 of the circuit 29. Movement of the member 31 selects one of several series resistor nodes. The voltage at the selected node is the signal used to set the controller 26 to a corresponding voltage for the output 30.

The voltage provided at the output 30 is regulated through the controller 26, which can provide overvoltage, overcurrent, and/or overtemperature protection. The controller 26 is connected to the output 30 and to the converters 22, 24. The controller 26 is coupled to the resistor 29 and configured to sense the voltage at the output 30, and to use information of the voltage at the output 30 along with information regarding the desired voltage from the resistor 29 (or switch 31), to provide control signals to the converter(s) 22, 24 such that the voltage at the output 30 is at the desired level. For example, the controller 26 can adjust pulse width modulation duty cycles to achieve the desired output voltage. The controller 26 is further configured to monitor voltage and current at the output 30. The controller 26 is configured to provide control signals to the converters 22, 24 to regulate the output voltage such that the output voltage is within a desired threshold (e.g., a desired percentage) of the desired output voltage. The controller 26 is further configured to monitor for overcurrent conditions and adjust the output voltage to protect against overcurrent conditions. If the output current exceeds a threshold (e.g., the current capable of being supplied by the source), then the controller 26 will control the active converter 22, 24 to reduce the output voltage. If the output voltage drops below a desired threshold, e.g., 90% of the desired output voltage, and the output current is undesirably high, then the controller will cause the active converter 22, 24 to shut down, and then will restart the appropriate converter 22, 24 (preferably after a predetermined delay time) to retry to achieve the desired output voltage while not exceeding the output current threshold. The controller 26 can monitor the temperature of the UPA 10 and if the temperature exceeds a temperature threshold for longer than a temperature-time threshold, then the controller 26 will shut down the active converter 22, 24 and re-activate the appropriate converter 22, 24, preferably after a predetermined delay time. Further, the controller 26 can monitor for overvoltage conditions. If the output voltage exceeds a threshold voltage for longer than a voltage-time threshold, then the controller 26 will shut down the active converter 22, 24 and re-activate the appropriate converter 22, 24, preferably after a predetermined delay time. A secondary set of resistors similar to, and in parallel with, the resistors 72, 74, 76, 78 can be provided to provide a second voltage for monitoring for an overvoltage condition.

Figure 6:
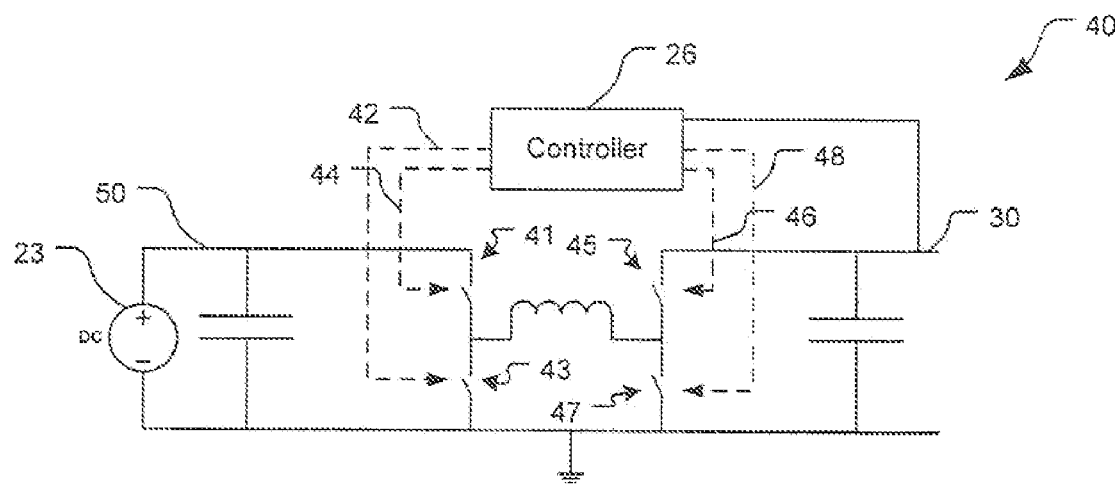
FIG. 6 is a simplified circuit diagram of a non-isolated up/down converter and a controller shown in FIG. 4.

Referring to FIG. 6, an exemplary non-isolated up/down converter circuit 40 includes four switches 41, 43, 45, and 47. The switches 43 and 45 may be implemented as diodes. The circuit 40 is non-isolated in that there is a conductive path between an input 50 and the output 30. The controller 26 is coupled to the output 30 and is coupled and configured to provide control signals to the switches 41, 43, 45, 47 to control the state (i.e., open/closed, off/on) of the switches 41, 43, 45, 47 as indicated by lines 42, 44, 46, 48, respectively. The controller 26 may include a processor and a memory encoded with software instructions that can be read and executed by the processor to perform functions as described herein. To operate in an up converter mode, with the output voltage greater than the input voltage, the controller 26 causes the switch 41 to be closed, the switch 43 to be open, and to have the switches 45 and 47 alternate between having the switch 45 closed and the switch 47 open and having the switch 45 open and the switch 47 closed. The duty cycle of the switch 47 is inversely (though not necessarily linearly) proportional to the output voltage relative to the input voltage such that increases in the amount of time that the switch 47 is closed relative to a period of switching of the switches 45, 47 (which is fixed) correspond with increases in the output voltage relative to the input voltage. The alternating can be pulse width modulated and is controlled in response to the detected output voltage so that the output voltage is provided at a desired level. To operate in a down converter mode, with the output voltage less than the input voltage, the controller 26 causes the switch 45 to be closed, the switch 47 to be open, and to have the switches 41 and 43 alternate between having the switch 41 closed and the switch 43 open and having the switch 41 open and the switch 43 closed. The duty cycle of the switch 41 is directly (and preferably roughly linearly) proportional to the output voltage relative to the input voltage such that increases in the amount of time that the switch 41 is closed relative to a period of switching of the switches 41, 43 (which is fixed) correspond with increases in the output voltage relative to the input voltage. The alternating can be pulse width modulated and is controlled in response to the detected output voltage so that the output voltage is provided at a desired level. The percentage of time that the switch 41 is closed relative to the period of the pulse width modulation cycle directly relates to the percentage of the output voltage level relative to the input voltage level.

Figure 7:
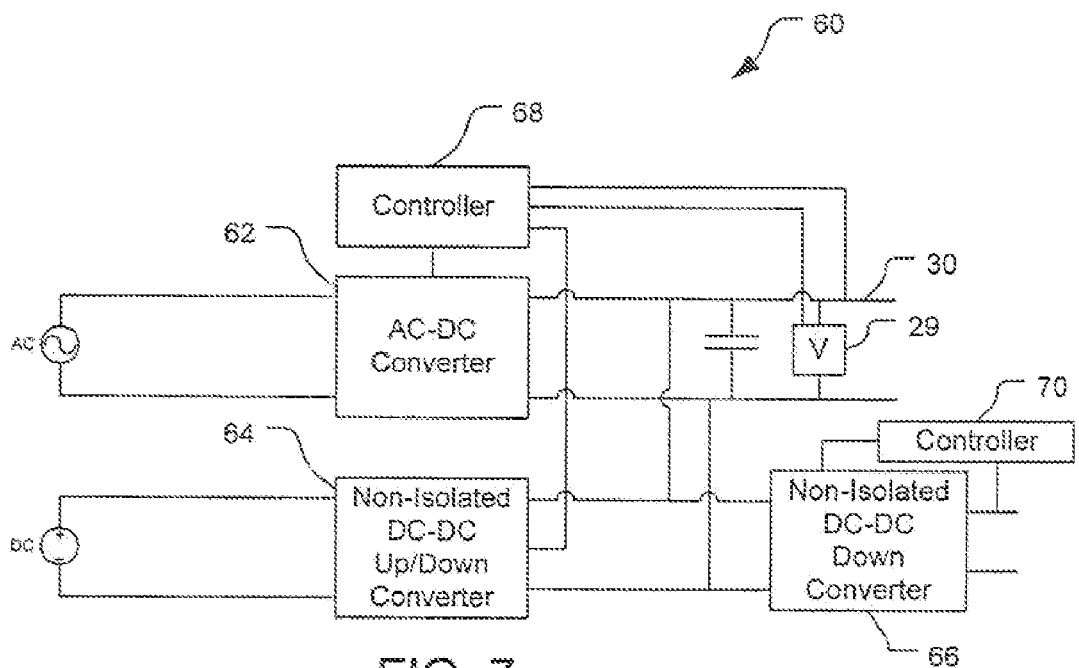
FIG. 7 is a simplified block and circuit diagram of another universal power adapter.

Referring to FIG. 7, a UPA 60 includes an AC-to-DC converter 62, a non-isolated DC-to-DC up/down converter 64, a non-isolated DC-to-DC down converter 66, and controllers 68, 70. The outputs of the converters 62, 64 are coupled to the input of the converter 66. The converter 66 is configured to receive the incoming DC power (e.g., between about 10 Vdc and about 20 Vdc) and down-convert the voltage of this incoming DC power to a desired auxiliary DC output level such as 10 W with a voltage of 5VDC, 3.3VDC, etc., e.g., for charging a cell phone, personal digital assistant, etc. The voltage provided by the converter 66 may be regulated by the controller 70 that provides feedback, forming a feedback loop, to the converter 66. The controller 70 is configured to monitor the output voltage from the converter 66 and to regulate a duty cycle of the converter 66 to adjust the output voltage as desired. The converter 64 is similar to the converter 24 and the converter 66 is similar to the down-converter configuration of the converter 24. Further, the combination of the controller 70 and the converter 66 is preferably configured to provide a fixed, non-selectable output voltage. Alternatively, however, the converter 66 could be configured to receive an indication of a desired voltage (e.g., from a switch similar to the switch 31 shown in FIGS. 1 and 5) and to provide an output voltage in accordance with the indication. While two controllers 68, 70 are shown, a single controller could be used to form feedback loops with the converters 62, 64 and with the converter 66.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, the controller 26 may be configured as multiple processors each dedicated to a respective voltage converter 22, 24.

The AC source and DC source can be connected to converters through a switch. For example, the AC source and the DC source voltage can be connected to the same input lines that are connected to inputs of a double-pull double-throw switch, with the outputs of the switch connected to the AC converter 22, 62 and the DC converter 24, 64. The double-pull double-throw switch is actuated such that the active source (either AC source or DC source) is connected to the appropriate converter.

The output voltage value may be affected in ways other than selecting a resistive value. For example, the position of the switch 31 could provide an indication of a desired voltage level to the processor 26, 66, which in turn could use this indication alone to control a feedback loop to affect the output voltage by varying the appropriate duty cycle of the appropriate converter 22, 24, 62, 64.

Further, while the description above refers to the invention, more than one invention may be described.

What is claimed is:

1. A power conversion device for receiving AC and/or DC power and providing a DC output, the device comprising:
    an AC input;
    a DC input;
    an output;
    AC-to-DC converter circuitry coupled to the AC input and to the output and configured to convert an AC voltage received at the AC input into a first output DC voltage and to provide the first output DC voltage to the output;
    non-isolated DC-to-DC up/down converter circuitry coupled to the DC input and to the output and configured to directly convert an input DC voltage received at the DC input into a second output DC voltage that is one of a down-converted DC voltage that is lower than the input DC voltage and an up-converted DC voltage that is higher than the input DC voltage, the DC-to-DC up/down converter circuitry being further configured to provide the second output DC voltage to the output;
    an auxiliary output; and
    non-isolated DC-to-DC down converter circuitry coupled to the auxiliary output, to the DC-to-DC up/down converter circuitry, and to the AC-to-DC converter circuitry and configured to convert a DC voltage provided by the DC-to-DC up/down converter circuitry and/or by the AC-to-DC converter circuitry to a lower voltage level and to provide the lower voltage level to the auxiliary output.

2. The device of claim 1 further comprising a second controller coupled to the auxiliary output and to the DC-to-DC down converter and configured to cause the DC-to-DC down converter to output a fixed DC voltage of one of about 3.3 Vdc and about 5 Vdc.

3. The device of claim 2 wherein the auxiliary output comprises a USB port with only power pins of the USB port connected to the DC-to-DC down converter circuitry.

4. A power conversion device for receiving AC and/or DC power and providing a DC output, the device comprising:
    an AC input;
    a DC input;
    an output;
    AC-to-DC converter circuitry coupled to the AC input and to the output and configured to convert an AC voltage received at the AC input into a first output DC voltage and to provide the first output DC voltage to the output;
    non-isolated DC-to-DC up/down converter circuitry coupled to the DC input and to the output and configured to directly convert an input DC voltage received at the DC input into a second output DC voltage that is one of a down-converted DC voltage that is lower than the input DC voltage and an up-converted DC voltage that is higher than the input DC voltage, the DC-to-DC converter circuitry being further configured to provide the second output DC voltage to the output;
    a first controller coupled to the output, the DC-to-DC up/down converter, and to the AC-to-DC converter and configured to regulate voltages provided by the DC-to-DC up/down converter and the AC-to-DC converter to provide a desired output voltage to the output;
    an auxiliary output;
    non-isolated DC-to-DC down converter circuitry coupled to the auxiliary output, to the DC-to-DC up/down converter circuitry, and to the AC-to-DC converter circuitry and configured to convert a DC voltage provided by the DC-to-DC up/down converter circuitry and/or by the AC-to-DC converter circuitry to a lower voltage level and to provide the lower voltage level to the auxiliary output; and
    a second controller coupled to the DC-to-DC down converter, to the DC-to-DC up/down converter, and to the AC-to-DC converter and configured to regulate a voltage provided by the DC-to-DC down converter and the AC-to-DC converter to provide a desired output voltage to the auxiliary output.

5. The device of claim 4 further comprising a selector coupled to the first processor and configured to be actuated to one of a discrete set of positions indicating respective discrete desired voltages.

6. The device of claim 5 wherein the DC-to-DC up/down converter circuitry includes a plurality of switches coupled to the controller and wherein the controller is configured to control opening and closing of the switches to regulate a duty cycle of the switches to provide the down-converted DC voltage and the up-converted DC voltage as appropriate in accordance with a position of the selector.

7. The device of claim 5 further comprising a resistor network and reference voltage source coupled to the output and wherein the selector is connected to the resistor network and configured to connect to different portions of the resistor network that provide different voltage values corresponding to the different positions of the selector.

8. The device of claim 4 wherein the first controller is configured to monitor voltage and current at the output and to guard against overvoltage and overcurrent conditions at the output.

9. The device of claim 4 wherein the first controller is coupled to a temperature sensor and is configured to monitor a temperature indicated by the temperature sensor and to guard against an overtemperature condition of the device.

* * * * *